Patented Apr. 4, 1950

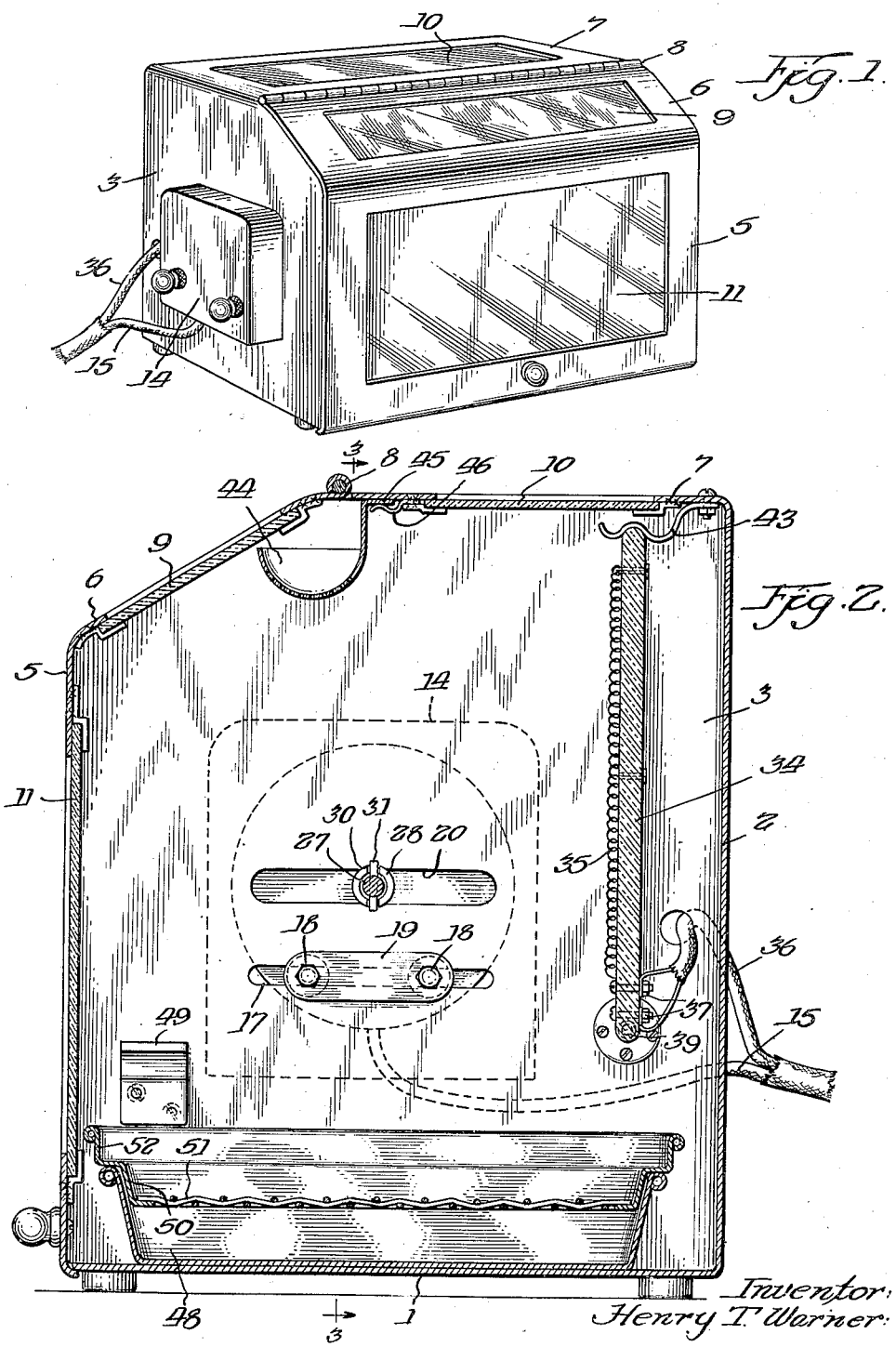

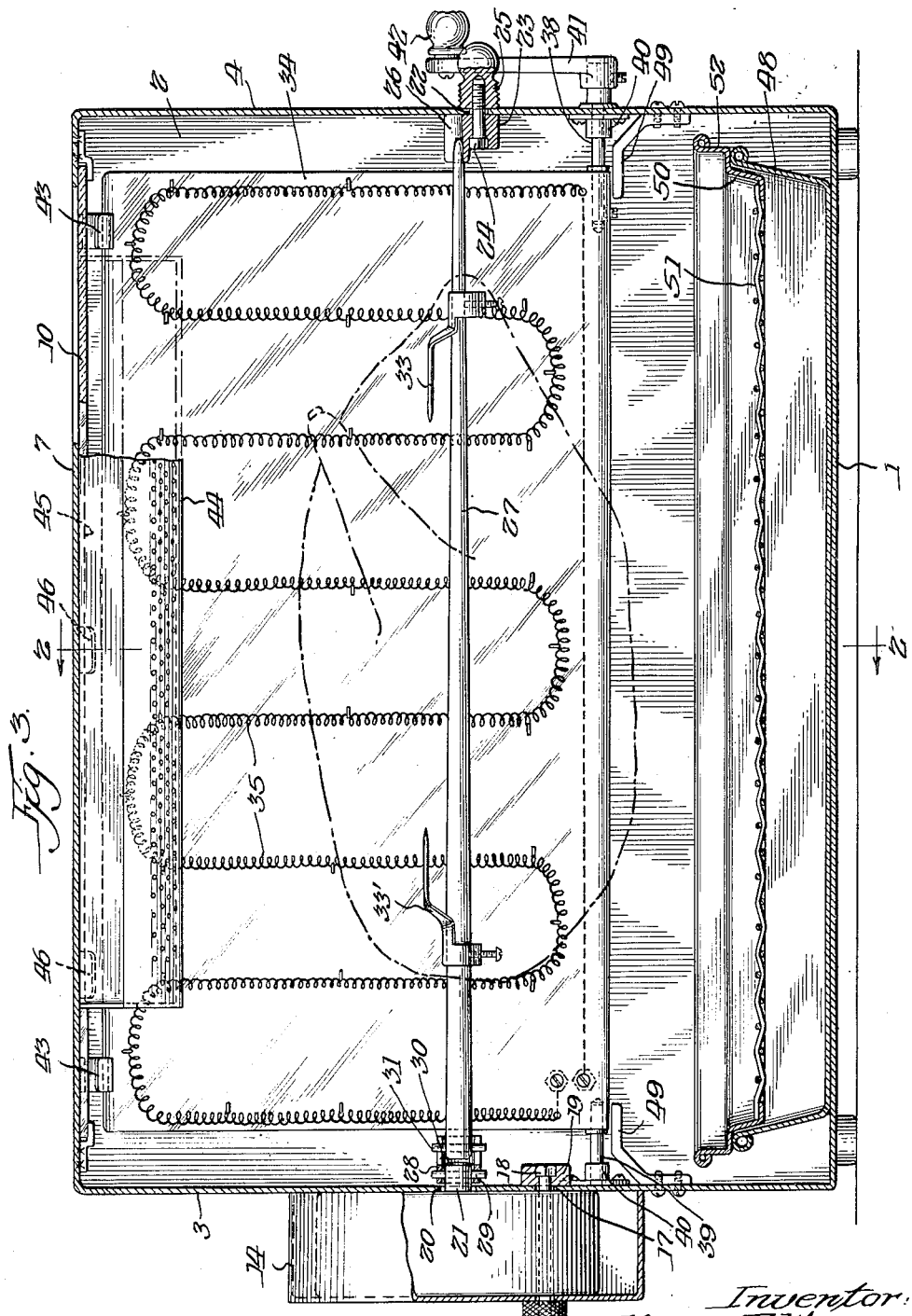

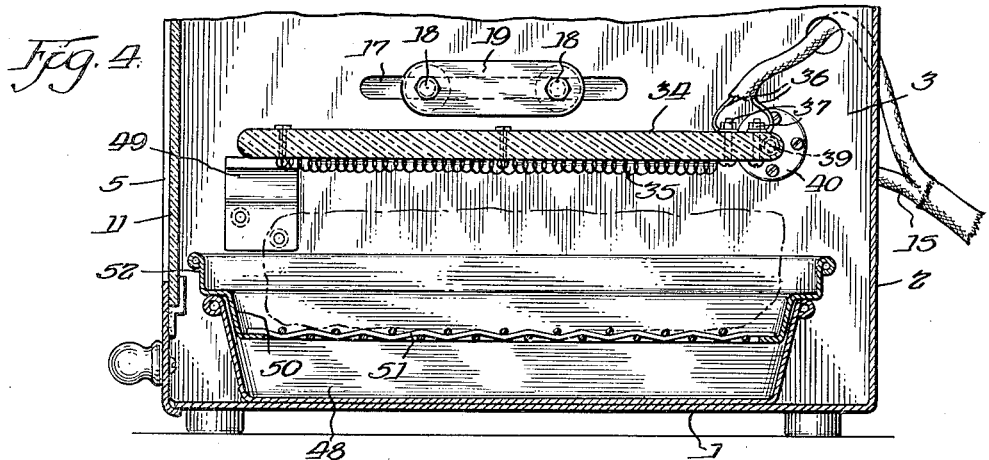
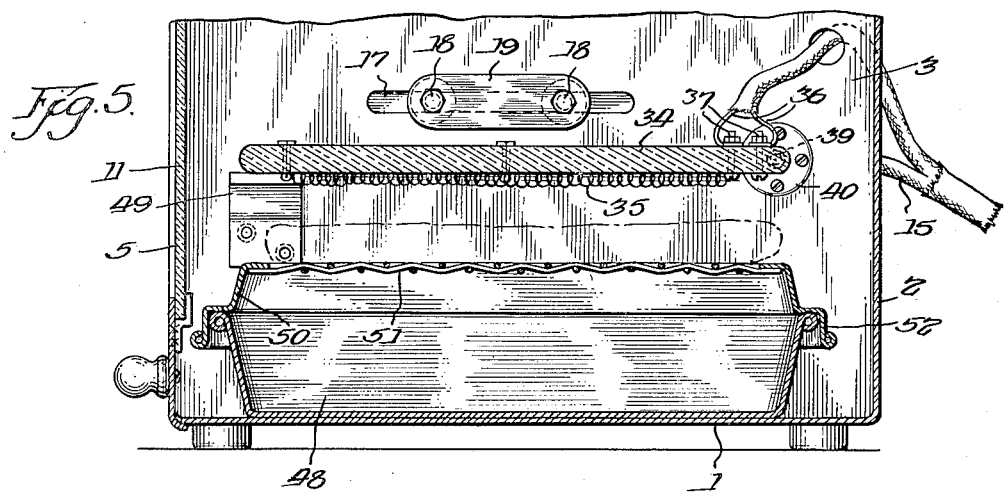
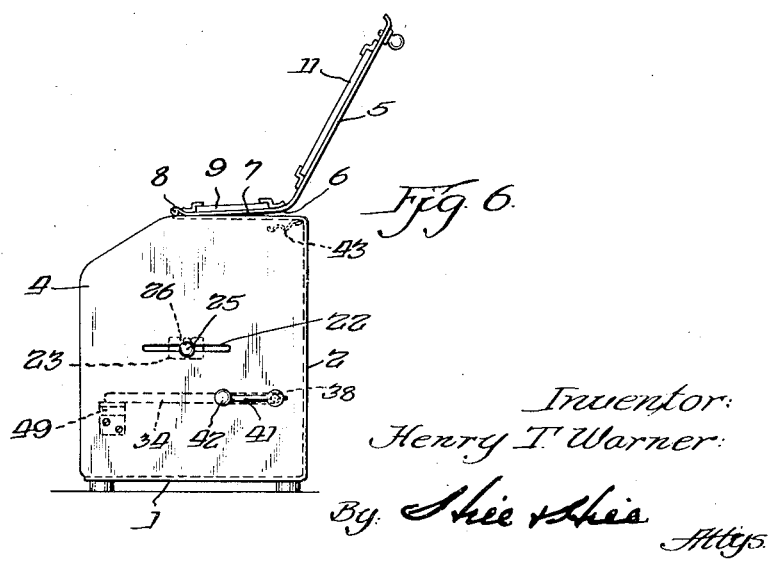
Inventor:
Henry T. Warner
By Shie & Shie
Attys.

2,502,685

UNITED STATES PATENT OFFICE 2,502,685

BARBECUE APPARATUS

Henry T. Warner, Chicago, Ill.

Application November 25, 1946, Serial No. 712,140

4 Claims. (Cl. 99—421)

My invention relates to a barbecue apparatus, particularly adapted for domestic or home use, for barbecuing or broiling fowl or meat by supporting and revolving the same adjacent a heating unit when barbecuing, or by moving and supporting the heating unit in proximity to the material when broiling and supporting the material in the desired position relative the heating unit.

The invention has among its objects the production of a simple, convenient, inexpensive, compact and efficient apparatus of the kind described particularly designed for use in the home, or in small restaurants or eating places.

A further object is the production of an attractive, light weight, portable driven apparatus.

Another object is the production of a device of the kind described in which the material to be barbecued or broiled may be enclosed during the barbecuing or broiling, conserving the heat as well as reducing the time required and also preventing the spattering of any grease.

A further object is the provision of a simple and efficient dispenser of butter, grease, water or other basting material during the operation of the apparatus.

A further object is the construction embodying a housing or casing enclosing apparatus having at least one of the walls thereof which may be opened up for charging the same or removing the material, and provided with windows or openings suitably covered by transparent panels so that the material treated may be seen during the operation of the apparatus without opening the casing.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a perspective view of the housing;

Fig. 2 is a cross sectional view taken substantially on line 2—2 of Fig. 3;

Fig. 3 is a longitudinal sectional view taken substantially on line 3—3 of Fig. 2;

Fig. 4 is a cross sectional view similar to Fig. 2 of the lower portion of the housing showing the heating unit lowered over the grille and pan;

Fig. 5 is a similar view showing the grille reversed to bring the material to be broiled closer to the heating unit; and Fig. 6 is an end elevation of the housing showing the front wall and that portion of the top constituting a cover turned up and back to the open position.

Referring to the drawings in which one embodiment of my invention is shown, there is provided a housing or casing consisting of a bottom 1, rear wall 2, end walls 3 and 4, a front wall 5 and top 7. As most clearly shown in Figs. 1 and 2, the front wall 5 is in the form of a door which extends upwardly and over as indicated at 6 and is pivoted or hinged at 8 to the top 7, the portions 6 and 7 forming substantially the top when the door 5 is closed down. Preferably, but not necessarily, one or more windows, 9, 10 and 11 may be provided in the walls 5, 6 and 7 so that the material being broiled or barbecued may be inspected without opening the door.

Preferably, adjustably arranged on one of the walls as shown end wall 3 is a power unit arranged within its housing 14, an electric motor ordinarily being employed. Extending to the motor from a suitable outlet, not shown, are the conducting wires 15. The power unit, including the housing and motor, is adjustably mounted on the end wall 3, the same being secured by one or more bolts 18 which extend through the slot 17 in the housing wall, 19 being a plate at the interior of the housing arranged between the bolts. A slot or opening 20, is also provided in the end wall through which the motor shaft 21 may project to the interior of the housing.

Adjustably mounted on the opposite end wall 4, is an open bearing or fork support 23 which is adjustably secured in place by the bolts 24 passing through the slot 22 in the end wall, 25 being a nut at the outside so that the bearing 23 may be rigidly secured in place as desired, the bearing having an open notch or groove 26 for removably supporting one end of the fork 27. The fork 27 is supported at the opposite end and operatively connected with the motor shaft 21, by means of a coupling consisting of a sleeve 28, pinned to the motor shaft as indicated at 29. The opposite end of the sleeve is provided with a slot 30, at each side so that the fork, provided with the pin 31, may be slipped into place and be positively driven by the motor shaft 21 through the sleeve. Arranged on the fork 27 are prongs 33 and 33'. These prongs are preferably slidably secured to the fork and may be locked in the desired position by set screws or the equivalent, the purpose of these prongs being to engage the material held on the fork 27, and prevent the relative movement of the material and fork when the device is operated as a barbecuing apparatus.

A suitable heating unit is arranged within the housing, and, as illustrated, a suitable heating or resistance coil 35 is mounted on a backing 34, the coil being provided with the usual feed wires 36, secured to binding posts 37 connected with the coil 35. The heating unit support 34, in the preferred construction is adjustably supported by means of the pins 38 and 39 at each end carried by suitable brackets 40, so that when the fork 27 is removed the heating unit may be moved down into a horizontal position substantially as shown in Figs. 4 and 5 for broiling puroses. As shown, the hinge pin 38 is provided with a handle 41, arranged at the exterior of the housing and rigidly secured to the hinge pin 38, the same having a knob 42. Obviously, the heating unit support 34 may be moved down, as shown in Fig. 4, or upwardly, as shown in Fig. 2, by moving the handle 41. The same is normally maintained in its vertical position, as shown in Fig. 2, by a latch member 43 of any suitable form. I also prefer to provide brackets 49 which will support the free edge of the support 34 when lowered to its horizontal position for broiling purposes.

I have also provided, as most clearly shown in Figs. 2 and 3, a removable pan or trough 44, provided with perforations through the same, which is mounted in the upper part of the housing and is adapted to contain butter, water or other basting material which will drip down as the material is being barbecued. As shown, this trough or container is provided with a flange 45, which engages between the top 7 and clips 46, secured thereto. Obviously, the pan or trough may be removed for cleaning.

Arranged within the housing and supported by the bottom 1, is a drip pan 48, which is ordinarily used in the device when barbecuing or broiling. I have also shown in Figs. 2, 3, 4 and 5, a grille 51 arranged in the frame 50, which is preferably formed as shown with a rim 52. When barbecuing, the grille may be removed if desired, but when broiling, the same provides a support for the material to be broiled, as for example, a steak or chops or other material. In Fig. 4 the grille is shown in substantially the same position shown in Fig. 3, while in Fig. 5, the same is shown reversed or turned over showing how the distance between the heating unit and the material to be broiled may be varied by reversing the grille and arranging it as shown in Fig. 4 or Fig. 5, thereby varying the heat and time of broiling.

In operation, assuming that material is to be barbecued, it is placed on the fork and the prongs 33 and 33' one or both of which are adjustable, maintain the material firmly on the fork. The motor and heating unit may be then operated so that the material on the fork is barbecued, the motor turning the same over and over, and at the same time if butter or other material is placed in the trough 44, the same will be properly basted. For barbecuing purposes the degree of heat applied to the material on the fork may be varied by adjusting the motor, fork and bearing 23 toward or away from the heating unit.

If it is desired to broil, the fork 27 may be readily detached from the coupling sleeve 28 and removed. The grille 51, may be placed in the desired adjustment, either as shown in Fig. 4 or Fig. 5, and the material placed thereon. The heating unit may then be moved down into the position shown in Figs. 4 or 5 above the material to be broiled and the coil 35 electrically energized.

While the device might be equipped with a gas burner rather than the electrical heating unit, obviously due to simplicity of construction as well as safety, the resistance coil type of heater is preferred. Since the motor is electrically driven the coil and motor may be connected in the same circuit outlet.

As stated in the objects of the invention, the device is very simple and convenient, the entire unit being very compact within a suitable housing and the device being of a weight that makes it conveniently portable. I have not described nor disclosed herein any automatic timing mechanism for controlling the motor or the heating unit, as obviously the application of a timing device or devices will be perfectly obvious to those familiar with such automatic mechanisms.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. In a combined barbecuing and broiling apparatus of the kind described and in combination, a housing comprising a base, end and front and rear walls and a top, a removable pan supported at the bottom and provided with a grille mounted on the same, a heating unit arranged at the rear of the housing and pivotally carried thereby, said unit movable to overlie the said pan and grille, means for retaining said heating unit in its raised position for barbecuing, and means for supporting the free edge of the same when disposed over the grille.

2. In a barbecuing and broiling apparatus of the kind described and in combination, a housing comprising a base, end and rear walls and a top, a removable fork mounted in the housing, a pan supported at the bottom and provided with a reversible grille mounted on the same, a heating unit vertically arranged at the rear wall and movably carried in the housing, said unit movable when the fork is removed to overlie the said pan and grille, means for retaining said heating unit in its raised vertical position, and means for supporting the free edge of the same when dropped and disposed over the grille.

3. In a barbecuing and broiling apparatus of the kind described and in combination, a housing having a bottom wall, end walls, front and rear walls and a top wall, a heating unit adjacent the rear wall, pivotal connections between said heating unit and end walls adjacent one edge of the heating unit, bearing brackets carried by the end walls, in which said pivotal connections are rotatably mounted, a handle mounted on one pivotal connection exteriorly of an end wall for rotating the heating unit from a vertical position to a horizontal position, retaining brackets secured to walls of the housing for engagement with the edge of the heating unit opposite the pivotal connections, a removable and replaceable fork within the housing and extending lengthwise thereof, a bearing bracket for one end of the fork adjustably secured on one end wall, a power unit including a housing adjustably secured to the other end wall, a coupling between the power unit and fork, a drip pan supported on the bottom wall below the fork, and a reversible grille removably supported on the drip pan.

4. In a barbecuing and broiling apparatus of the kind described and in combination, a housing having a bottom wall, end walls, front and rear walls and a top wall, a heating unit adjacent the rear wall, hinge pins secured to said heating unit adjacent one edge, bearing brackets carried by the end walls in which said pins are rotatably mounted, a handle mounted on one hinge pin exteriorly of an end wall for rotating the heating unit from a vertical position to a horizontal position, retaining brackets secured to walls of the housing for engagement with the edge of the heating unit opposite the hinge pins, a removable and replaceable fork within the housing and extending lengthwise thereof, a bearing bracket for one end of the fork adjustably secured on one end wall, a power unit including a housing adjustably secured to the other end wall, a coupling between the power unit and fork, a drip pan supported on the bottom wall below the fork, and a reversible grille removably supported on the drip pan.

HENRY T. WARNER.

REFERENCES CITED

The following references are of record in the file of this patent:

UNITED STATES PATENTS

| Number | Name | Date |
|---|---|---|
| 1,719,713 | Miller | July 2, 1929 |
| 2,092,226 | Simons | Sept. 7, 1937 |
| 2,182,225 | Garvis | Dec. 5, 1939 |
| 2,388,831 | Cramer | Nov. 13, 1945 |

FOREIGN PATENTS

| Number | Country | Date |
|---|---|---|
| 366,558 | Germany | Jan. 6, 1923 |
| 572,816 | Germany | Aug. 14, 1931 |